United States Patent
Ishigami

(10) Patent No.: US 12,215,746 B1
(45) Date of Patent: Feb. 4, 2025

(54) RATCHET TYPE ONE-WAY CLUTCH APPARATUS

(71) Applicant: NSK-Warner K.K., Tokyo (JP)

(72) Inventor: Shoma Ishigami, Fukuroi (JP)

(73) Assignee: NSK-WARNER K.K., Tokyo (JP)

(*) Notice: Subject to any disclaimer, the term of this patent is extended or adjusted under 35 U.S.C. 154(b) by 0 days.

(21) Appl. No.: 18/731,312

(22) Filed: Jun. 2, 2024

(30) Foreign Application Priority Data

Aug. 22, 2023 (JP) ................ 2023-134702
Aug. 22, 2023 (JP) ................ 2023-134705

(51) Int. Cl.
*F16D 41/12* (2006.01)

(52) U.S. Cl.
CPC ................ *F16D 41/12* (2013.01)

(58) Field of Classification Search
CPC ....................................... F16D 41/12
See application file for complete search history.

(56) References Cited

U.S. PATENT DOCUMENTS

| | | | | |
|---|---|---|---|---|
| 2003/0168301 A1* | 9/2003 | Kinoshita | ............ | F16D 41/18 192/46 |
| 2006/0021837 A1* | 2/2006 | Kimes | ............ | F16D 41/12 192/46 |
| 2015/0285319 A1* | 10/2015 | Kawai | ............ | F16D 41/30 192/45.1 |

FOREIGN PATENT DOCUMENTS

JP 2001-208104 A 8/2001

OTHER PUBLICATIONS

U.S. Appl. No. 18/731,328, filed Jun. 2, 2024.

* cited by examiner

*Primary Examiner* — Timothy Hannon
(74) *Attorney, Agent, or Firm* — Potomac Law Group, PLLC

(57) ABSTRACT

A ratchet type one-way clutch apparatus in which all pawl members are engageable with tooth portions stably, is provided. The one-way clutch 1 comprises an outer race 2, an inner race 3 and a first to nth pawl members 4a to 4c. A plurality of tooth portions 5 are formed on the outer circumferential surface of the inner race 3, and engageable with the first to nth pawl members 4a to 4c. A first to nth pawl member holding portions 12a to 12c are formed on the inner circumferential surface of the outer race 2 for holding the first to nth pawl members 4a to 4c. Biassing members 15a to 15c are held in the first to nth pawl member holding portions 12a to 12c for urging the first to nth pawl members 4a to 4c. The second to nth pawl member holding portions 12b, 12c are provided at positions deviated by arbitrary angles from positions where the inner circumferential surface of the outer race 2 is divided into n equal parts in the circumferential direction with reference to the position of the first pawl member holding portion 12a, viewed from a central axis O of the outer race 2.

5 Claims, 4 Drawing Sheets

RATCHET TYPE ONE-WAY CLUTCH APPARATUS

The disclosures of the following priority applications are herein incorporated by reference:
Japanese Patent Application No. 2023-134702, and
Japanese Patent Application No. 2023-134705.

TECHNICAL FIELD

The present invention relates to a ratchet type one-way clutch apparatus that is used for the purpose of a torque transmitting apparatus or backstop in vehicles and industrial machines and the like.

BACKGROUND ART

Conventionally, there is known a ratchet type one-way clutch apparatus adopting a ratchet mechanism which comprises a plurality of pawl members provided on an inner circumferential side of an outer race and a plurality of tooth portions provided on an outer circumferential side of an inner race to be respectively engageable (refer to, for example, Patent Document 1).

PRIOR ART DOCUMENT

Patent Document

[Patent document 1] JP Laid-open No. 2001-208104

SUMMARY OF THE INVENTION

Technical Problem to be Solved by the Invention

In designing a ratchet type one-way clutch apparatus, it is generally demanded that a plurality of pawl members and a plurality of tooth portions are simultaneously brought into engagement so that each pawl member may evenly share the torque load, in order to secure the maximum torque that can be transmitted between the inner and outer races.

However, in practice, due to manufacturing errors in the various components of the ratchet type one-way clutch apparatus, namely the outer race, inner race and pawl members, it is unlikely that the plural pawl members will equally receive the torque load when transmitting torque between the inner race and the outer race. In detail, one of the pawl members first engages a tooth portion, and as the torque increases, the individual components deform elastically so that the other pawl members start engaging the tooth portions. As it is random which pawl member receives the torque load first, due to manufacturing errors in respective components and depending on the position of the first pawl member that receives the torque load a case where any pawl members that cannot engage the tooth portions, would occur. And this may cause the ratchet type one-way clutch apparatus to have a smaller torque capacity than expected, and thus to be damaged.

In view of such a problem as described above, the invention of the present application has for its object to provide a ratchet type one-way clutch apparatus by which all pawl members can be engaged with the tooth portions stably.

Means for Solving the Problem

In order to solve the above problem, the present invention provides a ratchet type one-way clutch apparatus which comprises a cylindrical outer race,
a cylindrical inner race arranged in radially inner side of the outer race and rotatably relative to the outer race,
a first to nth pawl members arranged on an inner circumferential side of the outer race rotatably in a radial direction,
the outer circumferential surface of the inner race being formed with a plurality of tooth portions which the first to nth pawl members can engage,
the inner circumferential surface of the outer race being formed with a first to nth pawl member holding portions for holding respectively the first to nth pawl members,
the first to nth pawl member holding portions being provided respectively with biasing members to bias the first to nth pawl members towards the inner race, and
the second to nth pawl member holding portions being provided at positions each, viewed from a central axis of the outer race, deviating by an arbitrary angle from the position where the inner circumferential surface of the outer race is divided into n equal parts in the circumferential direction with reference to the position of the first pawl member holding portion, where n is an integer not less than 2 (n≥2).

Effect of the Invention

According to the present invention, it is possible to provide a ratchet type one-way clutch apparatus in which all pawl members can stably engage the tooth portions.

EMBODIMENTS FOR CARRYING OUT THE INVENTION

In the following, a ratchet type one-way clutch apparatus (herein after, simply called as "one-way clutch" according to each embodiment of the present invention will be described with referring to the accompanying drawings.

First Embodiment

Figure 1:
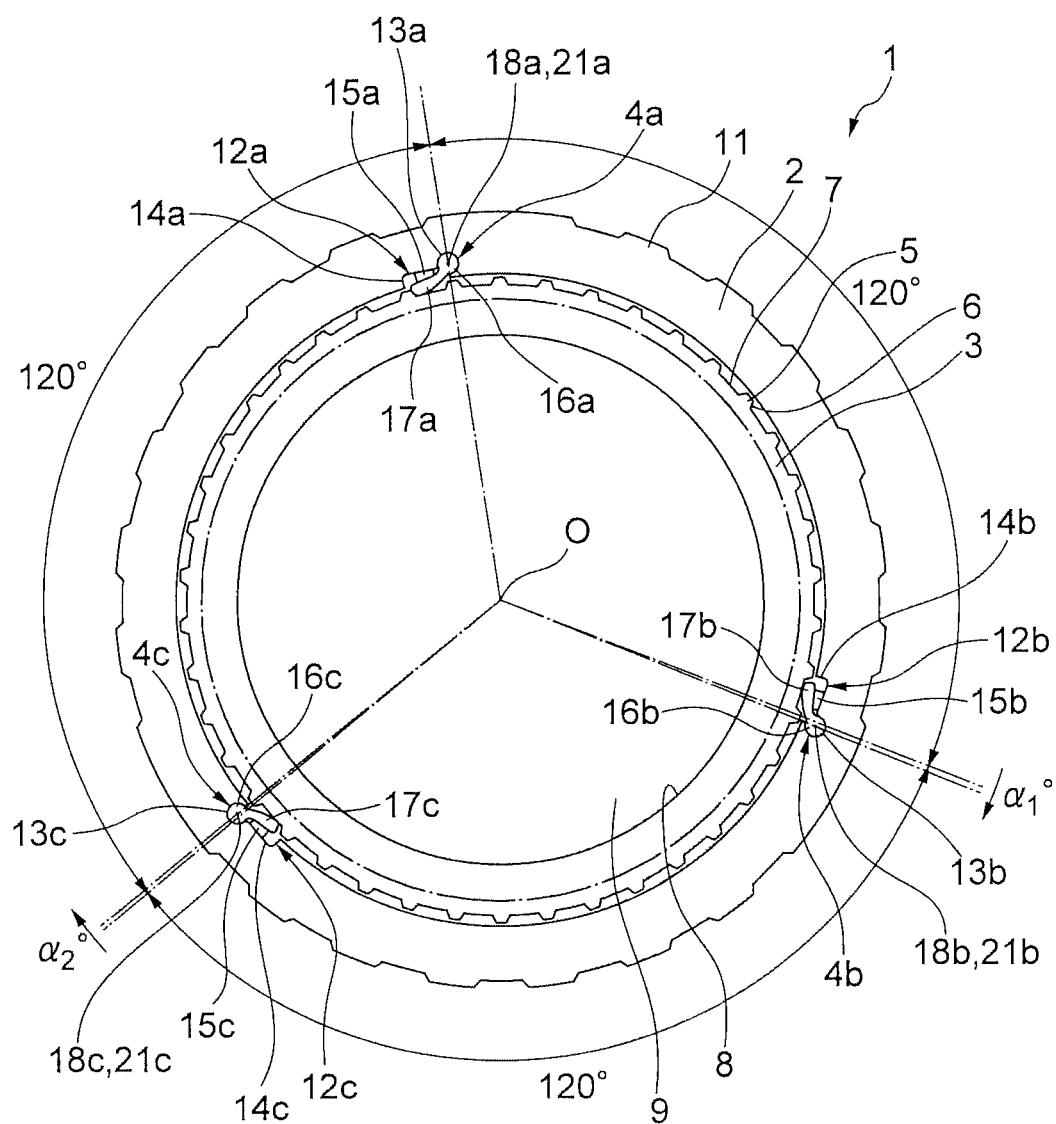
FIG. 1 is a cross sectional view of a cross section perpendicular to the central axis of the ratchet type one-way clutch apparatus according to a first embodiment of the present invention, viewed from one axial side.

At first, some terms relating to directions about the one-way clutch according to the first embodiment shown in FIG. 1 will be defined. In the description of the embodiment, the terms "axial direction", "radial direction" and "circumferential direction" of the one-way clutch 1 respectively refer to the axial direction, radial direction, and circumferential direction with respect to the central axis O of the one-way clutch 1 (that is, the central axis of the outer race 2 or the inner race 3). In the axial direction, the front side of the plane of the drawing sheets is referred to as one axial side, and the back side of the plane of the drawing sheets is referred to as the other axial side. In the circumferential direction, the clockwise direction towards the plane of the drawing sheets is referred to as one circumferential side (or clockwise direction) and the counterclockwise direction towards the plane of the drawing sheets is referred to as the other circumferential side (or counterclockwise direction). Meanwhile, regarding rotation of the one-way clutch 1, rotation of the inner race 3 relative to the outer race 2 will be explained, but it is noted that the rotation of the outer race 2 and the rotation of the inner race 3 are relative to each other. The above definitions on the directions of the one-way clutch 1 are applied to the second embodiment described herein later.

As shown in FIG. 1, the one-way clutch 1 comprises a circular cylindrical outer race 2, a circular cylindrical inner race 3 that is rotatable relative to the outer race 2, and a torque transmitting mechanism for carrying out torque transmission from the inner race 3 to the outer race 2. The torque transmitting mechanism of the one-way clutch 1, adopts a ratchet mechanism that includes the first to third pawl members 4a to 4c provided at the inner circumferential portions of the outer race 2.

The inner race 3 is spaced apart on inner side in the radial direction from the outer race 2 and is smaller in diameter than the outer race 2 and coaxial with the outer race 2. On the outer circumferential surface of the inner race 3, a plurality of tooth portions 5 projected radially outwardly and extended in the axial direction are provided over the entire circumferential surface and equi-distantly in the circumferential direction. The plurality of tooth portions 5 each have, viewed from the one axial side, a trapezoidal shape in cross section, and constitute the ratchet teeth to be meshed with the first to third pawl members 4a to 4c. In detail, with the wall surfaces 6 on the one circumferential side (clockwise side) of the tooth portions 5, the first to third pawl members 4a to 4c are brought into engagement and are meshed each other. Here, areas between the adjacent tooth portions 5 on the outer circumferential surface of the inner race 3 are referred to as the bottom surfaces 7, and entering of the pawl members 4a to 4c into between the tooth portions 5 respectively is referred to as dropping onto or arriving at the bottom surface 7.

The inner circumferential surface of the outer race 3 constitutes a shaft hole 8. In the shaft hole 8, a shaft 9 that is coaxial with the inner race 3, is fitted, and the inner race 3 and the shaft 9 are rotatable as one body. The shaft 9 is connected to an unillustrated drive mechanism through an unillustrated gear mechanism, for example. The shaft 9 and the shaft hole 8 may be spline-fitted.

On the outer circumferential surface of the outer race 2, a plurality of the projected portions 11 projected radially outwardly and extended in the axial direction are provided along the circumferential direction. The projected portions 11 each have, viewed from the one axial side, a trapezoidal cross section, and are fitted in an unillustrated shaft connected to an unillustrated driven mechanism, for example.

Figure 2A:
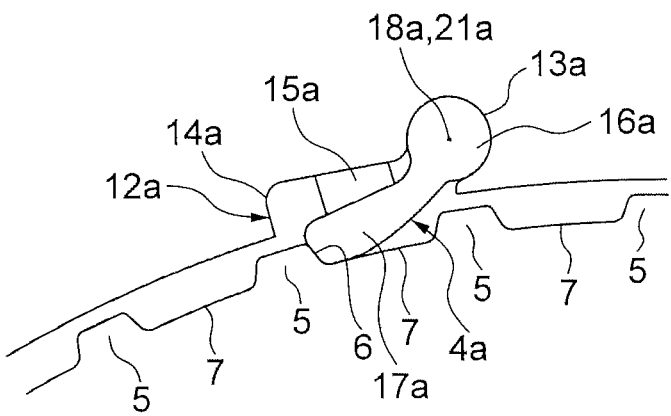
FIGS. 2A to 2C are partially enlarged views showing configuration of the first to third pawl members and the first to third pawl member holding portions in the ratchet type one-way clutch apparatus according to the first embodiment of the present invention shown in FIG. 1.
Figure 2B:
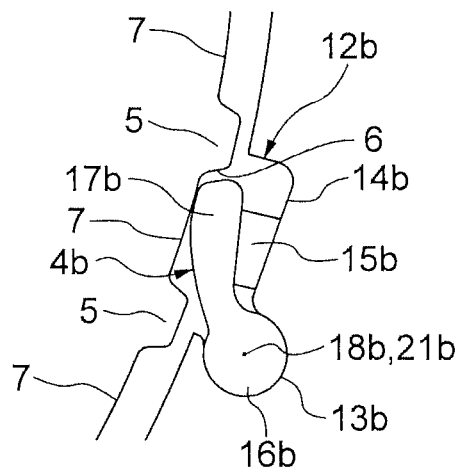
Figure 2C:
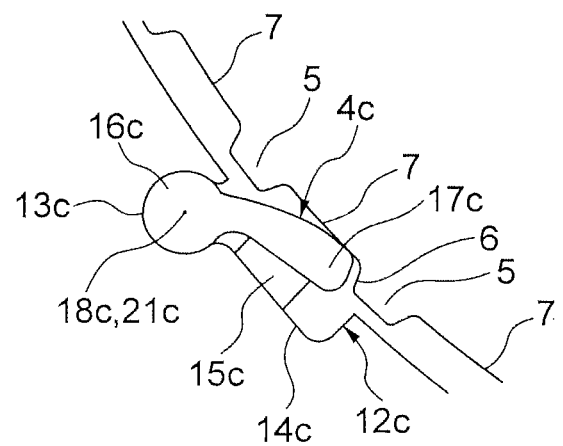

On the inner circumferential portions of the outer race 2, the first to third pawl member holding portions 12a to 12c extended in the axial direction are formed at substantially equal intervals in the circumferential direction (refer to FIGS. 2A to 2C). The afore mentioned first to third pawl members 4a to 4c are respectively held in the first to third pawl member holding portions 12a to 12c.

The first pawl member holding portion 12a is a concaved portion opened radially inwardly on the inner circumferential surface of the outer race 2. The first pawl member holding portion 12a is comprised of a first concave portion 13a and a second concave portion 14a continuously neighboring to the first concave portion 13a on the other circumferential side thereof.

The first concave portion 13a of the first pawl member holding portion 12a is, viewed from the one axial side, a circular portion concaved towards one circumferential side and radially outwardly from the inner circumferential surface of the outer race 2, thereby holding the first pawl member 4a to allow the swinging movement therein.

The second concave portion 14a of the first pawl member holding portion 12a is, viewed from the one axial side, a rectangular portion concaved towards the other circumferential side and radially outwardly from the inner circumferential surface of the outer race 2. At the bottom surface of the second concave portion 14a is further formed with an unillustrated concave portion concaved radially outwardly, in which concaved portion an elastic member 15a is set as a biasing member for biasing or pushing the first pawl member 4a onto the inner race 3 side. Meanwhile, the bottom surface of the concaved portion on which the elastic member 15a is set is referred as a setting surface of the elastic member 15a.

Meanwhile, the second and third pawl member holding portions 12b and 12c have similar configurations to the first pawl member holding portion 12a, and include respectively the first concave portions 13b, 13c, the second concave portions 14b, 14c and the elastic members 15b, 15c. The elastic members 15a, 15b, 15c may be coil springs, for example.

A first pawl member 4a has a predetermined circumferential length and is a metal member elongated in the axial direction. The first pawl member 4a comprises, viewed from the one axial side, a circular portion 16a, and a rectangular pawl portion 17a projected integrally from the circular portion 16a towards the other circumferential side.

The circular portion 16a of the first pawl member 4a is held in the first concave portions 13a of the first pawl member holding portion 12a, as shown in FIG. 2A and is rotatable (swingable) about the center 18a of the circular portion 16a.

The pawl portion 17a of the first pawl member 4a is disposed in the second concave portion 14a of the first pawl member holding portion 12a, and is always forced towards the inner race 3 side (radially inwardly) by the elastic member 15a provided in the second concave portions 14a. The pawl portion 17a of the first pawl member 4a is projected from through the opening on the inner race 3 side of the second concave portions 14a to the circumferential other side and to the inner race 3 side.

Meanwhile, the second and third pawl members 4b and 4c have similar configuration to the first pawl member 4a, and include respectively the circular portions 16b, 16c and the pawl portions 17b, 17c.

The tooth portions 5 of the inner race 3, the first to third pawl member holding portions 12a to 12c of the outer race 2, the first to third pawl members 4a to 4c held in the first to third pawl member holding portion 12a to 12c and the elastic members 15a to 15c compose a rachet mechanism of the one-way clutch 1.

In the one-way clutch 1 configured as described above, when the inner race 3 is rotated in the clockwise direction together with the shaft 9 driven by an unillustrated driving device, the relative rotation of the inner race 3 to the outer race 2 is fixed, and the inner race 3 and the outer race 2 and the unillustrated shaft fitted on the outer race 2 are rotated as one body. On the other hand, when the inner race 3 is rotated in the counterclockwise direction, the inner race 3 freely rotates relative to the outer race 2.

In detail, upon the inner race 3 rotating clockwise, the first to third pawl members 4a to 4c in the outer race 2 respectively mesh with the tooth portions 5 of the inner race 3. Concretely, the tips of the pawl portions 17a to 17c of the first to third pawl members 4a to 4c in the outer race 2 are brought into engagement with the wall surfaces 6 on the one circumferential side of the tooth portions 5. As described, the wall surfaces 6 on the one circumferential side of the tooth portions 5 constitute the meshing surfaces of the tooth portions 5 which mesh respectively with the first to third pawl members 4a to 4c. By meshing the first to third pawl members 4a to 4c with the respective tooth portions 5, the inner race 2 and the outer race 3 rotate together as one body so that torque is transmitted from the inner race 3 to the outer race 2. Meanwhile, in a case where the outer race 2 is fixed, the one-way clutch 1 functions as backstop that impedes clockwise rotation of the inner race 3.

On the other hand, upon the inner race 3 rotating counterclockwise, the first to third pawl members 4a to 4c do not mesh with the tooth portions 5 of the inner race 3. Specifically, when the tooth portions 5 of the inner race 3 come in contact with the first to third pawl members 4a to 4c, the inner race 3 rotates while the tooth portions 5 push the first to third pawl members 4a to 4c radially outwardly against biasing forces of the elastic members 15a to 15c. Thus, the inner race 3 rotates freely from the outer race 2, so no torque is transmitted from the inner race 3 to the outer race 2.

In the one-way clutch 1 according to the present embodiment, when the first to third pawl members 4a to 4c mesh with the tooth portions 5 respectively, no first to third pawl members 4a to 4c are bounced radially outwardly in the non-engagement direction by the meshing surfaces 6 of the tooth portions 5, that is, and ride up on the tooth portions 5, so the first to third pawl members 4a to 4c can be brought into engagement with the tooth portions 5 securely.

The configuration of the ratchet mechanism of the present embodiment, which achieves these effects, is described in detail below.

In the present embodiment, the second and third pawl member holding portions 12b and 12c are provided respectively at positions deviating by arbitrary angles $\alpha_1$ and $\alpha_2$ degrees from the positions dividing the inner circumferential surface of the outer race 2 into three equal parts in the circumferential direction, as viewed from the central axis O of the outer race 2.

In detail, on the inner circumferential surface of the outer race 2, the second pawl member holding portion 12b is provided so that, with reference to the center 21a of the first concave portion 13a in the first pawl member holding portion 12a (=the center of rotation of the first pawl member 4a), the center 21b of the first concave portion 13b in the second pawl member holding portion 12b is located at a position displaced or deviating by an arbitrary angle $\alpha_1$ degrees in one circumferential side (clockwise direction) from the position trisecting the inner circumferential surface of the outer race 2 in the circumferential direction as viewed from the central axis O. In other words, the angle in the clockwise direction between the center 21a of the first concave portion 13a in the first pawl member holding portion 12a and the center 21b of the first concave portion 13b in the second pawl member holding portion 12b, centered on the central axis O, is $(120+\alpha_1)$ degrees. Meanwhile, it is desirable that the arbitrary angle $\alpha_1$ should be set in consideration of the amount of deformation when each component of the one-way clutch 1, namely the outer race 2, inner race 3 and first to third pawl members 4a to 4c are elastically deformed under torque load and the mounting clearances during assembly.

On the inner circumferential surface of the outer race 2, the third pawl member holding portion 12c is provided so that, with reference to the center 21a of the first concave portion 13a of the first pawl member holding portion 12a, the center 21c of the first concave portion 13c in the third pawl member holding portion 12c is located at the position displaced or deviating by an arbitrary angle $\alpha_2$ degrees in the clockwise direction from another position trisecting the inner circumferential surface of the outer race 2 in the circumferential direction as viewed from the central axis O. In other words, the angle in the clockwise direction between the center 21a of the first concave portion 13a in the first pawl member holding portion 12a and the center 21c of the first concave portion 13c in the third pawl member holding portion 12c, centered on the central axis O, is $(240+\alpha_2)$ degrees. Meanwhile, it is desirable that the arbitrary angle $\alpha_2$ like the aforementioned arbitrary angle $\alpha_2$ should be set in consideration of the amount of deformation when each component of the one-way clutch 1 is elastically deformed under torque load and the mounting clearances during assembly, and the arbitrary angle $\alpha_1$ degrees may be equal to the arbitrary angle $\alpha_2$ degrees ($\alpha_2=\alpha_1$). Hereinafter, the configuration on the first to third pawl member holding portion 12a to 12c as described above is called as "first configuration".

According to the first configuration, when the inner race 3 is rotated in the clockwise direction, at first the pawl portion 17a of the first pawl member 4a in the outer race 2 drops onto or arrive at the bottom surface 7 of the inner race 3 and is engaged with the meshing surface 6 of the tooth portion 5, as shown in FIG. 2A.

At this time, the pawl portion 17b of the second pawl member 4b drops on or arrives at the bottom surface 7 of the inner race 3. Since the location of the second pawl member holding portion 12b in the inner circumferential surface of the outer race 2 is displaced or deviated by the arbitrary angle $\alpha_1$ degrees circumferentially from the position trisecting the inner circumferential surface of the outer race 2 in the circumferential direction, as described above, a circumferential clearance is generated between the tip end face on the other circumferential side (counterclockwise direction side) of the pawl portion 17b of the second pawl member 4b and the meshing surface 6 of the tooth portion 5, as shown in FIG. 2B. Accordingly, the pawl portion 17b of the second pawl member 4b can drop onto or arrive at the bottom surface 7 of the inner race 3, without the pawl portion 17b riding up on the tooth portion 5. And, by further rotation of the inner race 3 in the clockwise direction, or by elastic deformation of the constituent elements due to torque load or presence of mounting play (looseness) for assembling, the circumferential clearance disappears, and the pawl portion 17b of the second pawl member 4b can be brought into engagement with the meshing surface 6 of the tooth portion 5. Meanwhile, the pawl portion 17c of the third pawl member 4c acts in the same way as the pawl portion 17b of the second pawl member 4b at the time when the inner race 3 rotates in the clockwise direction.

As described above, when the inner race 3 is rotated in the clockwise direction, the respective pawl portions 17a to 17c of the first to third pawl members 4a to 4c can be engaged with the tooth portions 5 surely. For this reason, upon transmitting torque from the inner race 3 to the outer race 2, the torque load can be shared by the first to third pawl members 4a to 4c. Accordingly, the one-way clutch 1 can ensure the maximum torque transmittable between the inner race 3 and the outer race 2. Further, it is possible to eliminate an occurrence of a case where any pawl member can not engage the tooth portion 5, so the one-way clutch 1 can be prevented from reducing in torque capacity and from being damaged. Furthermore, it is not necessary to increase the number of pawl members to secure the safety of the one-way clutch 1, and it is not required to enlarge diameter of the one-way clutch 1.

With respect to the present embodiment, the elastic member 15a in the first pawl member holding portion 12a has a larger elasticity than the elastic members 15b or 15c in the second and third pawl member holding portion 12b or 12c. The load P1 of the elastic member 15a in the first pawl member holding portion 12a for biasing or pushing the first pawl member 4a is larger than the load P2 or P3 of the elastic member 15b or 15c in the second or third pawl member holding portion 12b or 12c for biasing or pushing the second or third pawl member 4b or 4c (P1>P2, P1>P3). The same elastic members having the same elastic force are used for the elastic member 15b in the second pawl member holding portion 12b and for the elastic member 15c in the third pawl member holding portion 12c. That is, the load P2 of the elastic member 15b in the second pawl member holding portion 12b and the load P3 of the elastic member 15c in the third pawl member holding portion 12c are the same (P2=P3). This configuration of the elastic members 15a to 15c in the first to third pawl member holding portions 12a to 12c is referred to as the "second configuration".

According to the above mentioned second configuration, when the inner race 3 is rotated in the clockwise direction and the pawl portions 17a to 17c of the first to third pawl members 4a to 4c drop onto or arrive at the bottom surfaces 7 in the inner race 3, the dropping speed of the pawl portion 17a of the first pawl member 4a arriving at the bottom surface 7 can be made larger than the dropping speed of the pawl portions 17b or 17c of the second or third pawl member 4b or 4c.

In other words, when the inner race 3 is rotated in the clockwise direction, the pawl portion 17a of the first pawl member 4a can drop onto or arrive at the bottom surface 7 of the inner race 3 more quickly than the pawl portion 17b or 17c of the second or third pawl member 4b or 4c, and the pawl portion 17a of the first pawl member 4a can be brought into engagement firstly with the tooth portion 5. And, subsequent to the first pawl member 4a, the pawl portion 17b or 17c of the second or third pawl member 4b or 4c drops onto or arrives at the bottom portion 7 of the inner race 3 and is brought into engagement with the tooth portion 5.

Thus, the one-way clutch 1 can attain the effects by the above mentioned first configuration of the first to third pawl member holding portions 12a to 12c more surely.

According to the present embodiment, it is possible to realize the one-way clutch 1 in which all of the first to third pawl members 4a to 4c can be engaged with the tooth portions 5 safely and transmit maximum torque thereto without causing any damage.

Second Embodiment

Figure 3:
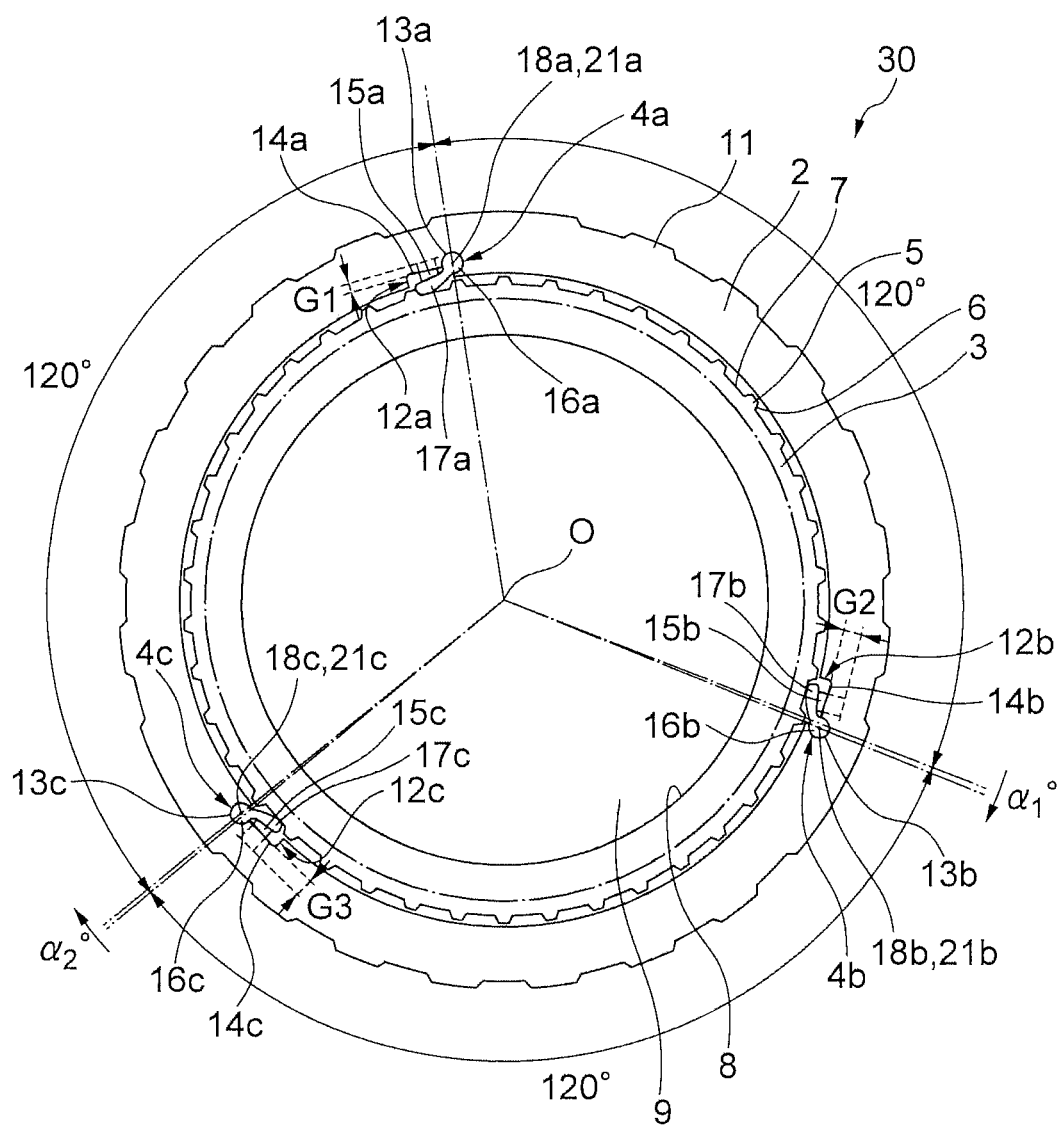
FIG. 3 is a cross sectional view of a cross section perpendicular to the central axis of the ratchet type one-way clutch apparatus according to the second embodiment of the present invention, viewed from one axial side.

Regarding a one-way clutch 30 according to the second embodiment shown in FIG. 3, the same references are used and duplicate explanations are omitted with respect to the same or similar configuration to the first embodiment described above, and different configuration will be described in detail.

With respect to the present embodiment, the elastic members having the same elastic forces, are used as the elastic members 15a to 15c in the first to third pawl member holding portions 12a to 12c (P1=P2=P3).

Figure 4A:
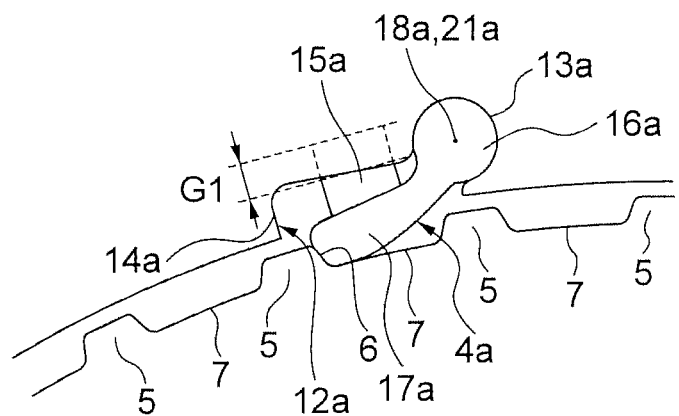
FIGS. 4A to 4C are partially enlarged views showing configuration of the first to third pawl members and the first to third pawl member holding portions in the ratchet type one-way clutch apparatus according to the second embodiment of the present invention shown in FIG. 3.
Figure 4B:
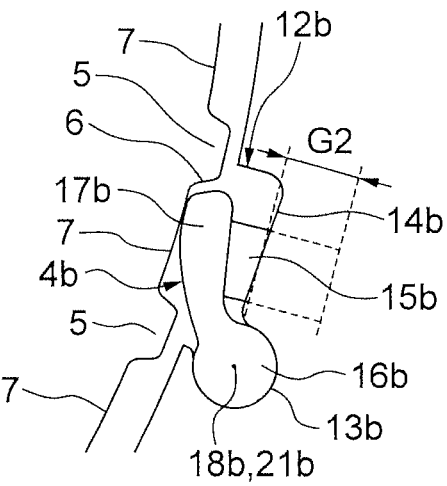
Figure 4C:
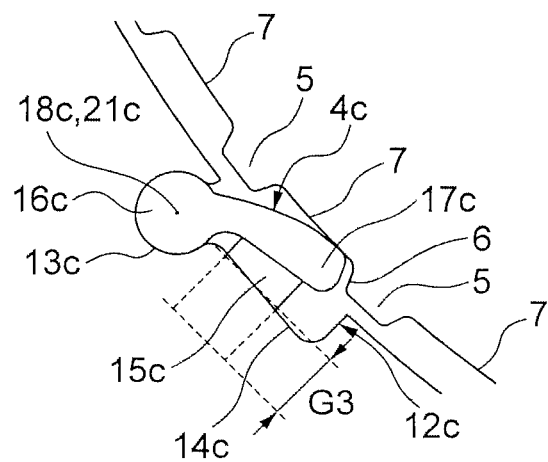

In the present embodiment, design is so made that depth G1 of the setting surface of the elastic member 15a in the first pawl member holding portion 12a is smaller than depth G2 or G3 of the setting surface of the elastic member 15b or 15c in the second or third pawl member holding portion 12b or 12c (G1<G2, G1<G3), as shown in FIGS. 4A to 4C. Here, in detail, depths G1 to G3 of the setting surfaces of the elastic members 15a to 15c are respective distances in the radial direction from the bottom surfaces (the setting surfaces of the elastic members 15a to 15c) of the second concave portions 14a to 14c in the first to third pawl member holding portion 12a to 12c to the bottom surfaces of the concave portions extended radially outwardly formed on the bottom surfaces of the second concave portions 14a to 14c to set the elastic members 15a to 15c shown by dotted lines in FIGS. 4A to 4C.

Meanwhile, the depth G2 of the setting surface of the elastic member 15b in the second pawl member holding portion 12b is designed to be equal to the depth G3 of the setting surface of the elastic member 15c in the third pawl member holding portion 12c (G2=G3).

Such configuration of the elastic members 15a to 15c and the setting surfaces thereof in the first to third pawl member holding portions 12a to 12c, is referred to as "third configuration".

According to the third configuration, an interval in the radial direction between the setting surface of the elastic member 15a in the first pawl member holding portion 12a and the pawl portion 17a of the first pawl member 4a, is smaller than an interval in the radial direction between the setting surface of the elastic member 15b in the second pawl member holding portion 12b and the pawl portion 17b of the second pawl member 4b or an interval in the radial direction between the setting surface of the elastic member 15c in the third pawl member holding portion 12c and the pawl portion 17c of the third pawl member 4c. For this configuration, when the inner race 3 is rotated and the tooth portions 5 of the inner race 3 are brought in contact with the first to third pawl members 4a to 4c, a larger force is applied to the elastic member 15a in the first pawl member holding portion 12a than to the elastic member 15b or 15c in the second or third pawl member holding portions 12b or 12c, so a biasing force by the elastic member 15a in the first pawl member holding portion 12a becomes larger than a biasing force by the elastic member 15b or 15c in the second or third pawl member holding portion 12b or 12c. Accordingly, the above third configuration of the present embodiment can achieve the same or similar effect as the second configuration of the first embodiment, as described above.

Therefore, the one-way clutch 30 according to present embodiment can achieve the same or similar effect as the one-way clutch 1 according to the first embodiment, as described above.

By the way, the above first embodiment is an example in which the first configuration and the second configuration as explained above are combined, and the above second embodiment is an example in which the first configuration and the third configuration as explained above are combined. However, the present invention is not limited to the above embodiments, and the first, second and third configurations may be combined together. In other words, while an elastic member having a larger elastic force than that of the elastic member 15b or 15c in the second or third elastic member holding portions 12b or 12c, is used for the elastic member 15a in the first pawl member holding portion 12a (P1>P2, P1>P3), the depth G1 of the setting surface of the elastic member 15a in the first pawl member holding portion 12a may be made smaller than the depth G2 or G3 of the setting surface of the elastic member 15b or 15c in the second or third pawl member holding portion 12b or 12c (G1<G2, G1<G3). By this configuration, upon rotating the inner race 3 in the clockwise direction, speeds of the first to third pawl members 4a to 4c dropping onto or arriving at the bottom surfaces 7 in the inner race 3 may be set more appropriately.

In the above embodiments, the one-way clutches 1 and 30, each are equipped with three pawl members (first to third pawl members 4a to 4c) and three pawl member holding portions (first to third pawl member holding portions 12a to 12c), but the number of the pawl members or the number of the pawl member holding portions is not limited to three.

For example, assuming a case where the number of the pawl members and the number of the pawl member holding portions is "n" each (n is an integer that is not less than 2), the second to nth pawl member holding portions may be respectively provided at positions displaced by an arbitrary angle from positions where the inner circumferential surface of the outer race 2 is divided into n equal parts in the circumferential direction with the first pawl member holding portion as reference, viewed from the central axis O of the outer race 2. More specifically, the second to nth pawl member holding portions may be provided on the inner circumferential surface of the outer race 2 so as to satisfy the following conditional expression (1). Meanwhile, the arbitrary angles $\alpha_1$ to $\alpha_{n-1}$ shall be set respectively for the second to nth pawl member holding portions.

$$A=(360/n)\times(m-1)+\alpha_{m-1} \quad (1)$$

where "A" denotes angle (unit: degree) between the arc from the position of the first pawl member holding portion to the position of the second to nth pawl member holding portions on the inner circumferential surface of the outer race 2 and the central axis O of the outer race 2;

"n" denotes the number of the first to nth pawl member holding portions (n is an integer not less than 2);

"m" denotes order of the second to nth pawl member holding portions counted from the first pawl member holding portion as the first one (m is an integer); and "$\alpha_{m-1}$" denotes an arbitrary angle (unit: degree) of the second to nth pawl member holding portions.

In the one-way clutch 1 or 30 according to the above embodiments, the inner race 3 is on the input side, the outer race 2 is on the output side, and torque is transmittable from the inner race 3 to the outer race 2. However, the present invention is not limited to such embodiments, and is applicable to a one-way clutch in which an outer race is on the input side, an inner race is on the output side, and torque is transmitted from the outer race to the inner race.

In the one-way clutch 1 and 30 according to the above embodiments, the first to third pawl members 4a to 4c are brought into engagement with the wall surfaces 6 on the one circumferential side of the tooth portions 5, and thereby the clockwise rotation of the inner race 3 is transmitted to the outer race 2. However, the present invention is not limited to this, and the present invention can be applied to a so-called ratchet type torque transmitting direction change-over one-way clutch which comprises further a plurality of pawl members that are engageable with wall surfaces on the other circumferential side of the tooth portions 5 and in which a state where clockwise rotation of the inner race 3 is transmitted to the outer race 2 and a state where counterclockwise rotation of the inner race 3 is transmitted to the outer race 2 are selectively changed over by changing over between the last-mentioned the plurality of pawl members and the first to third pawl members 4a to 4c.

EXPLANATION OF REFERENCES 1, 30: one-way clutch
2: outer race
3: inner race
4a to 4c: first to third pawl members
5: tooth portion of inner race
6: wall surface (meshing surface) of tooth portion
12a to 12c: first to third pawl member holding portions
13a to 13c: first concave portions of first to third pawl member holding portions
14a to 14c: second concave portions of first to third pawl member holding portions
15a to 15c: elastic members of first to third pawl member holding portions
16a to 16c: circular portions of first to third pawl members
17a to 17c: pawl portions of first to third pawl members
18a to 18c: centers of circular portions of first to third pawl members
21a to 21c: centers of first concave portions of first to third pawl member holding portions
O: central axis of inner race and outer race

What is claimed is:

1. A ratchet type one-way clutch apparatus comprising:
a cylindrical outer race;
a cylindrical inner race arranged radially inside the outer race and rotatably relative to the outer race;
a first to nth pawl members, wherein "n" is an integer not less than 2, disposed on an inner circumference side of the outer race rotatably in the radial direction;
a plurality of tooth portions formed on the outer circumferential surface of the inner race, the tooth portions being engageable with the first to nth pawl members;
a first to nth pawl member holding portions formed on the inner circumferential surface of the outer race for holding the plurality of the pawl members;
biasing members held in the first to nth pawl member holding portions for urging the first to nth pawl members towards the inner race side;
the second to nth pawl member holding portions being provided at positions deviated by arbitrary angles from positions where the inner circumferential surface of the outer race is divided into "n" equal parts in the circumferential direction with the first pawl member holding portion as reference, viewed from a central axis of the outer race.

2. The ratchet type one-way clutch apparatus according to claim 1, wherein the biasing member in the first pawl member holding portion has a larger elastic force than each elastic force of the biasing members in the second to nth pawl member holding portions.

3. The ratchet type one-way clutch apparatus according to claim 1, wherein the biasing members are disposed respectively between the first to nth pawl members and the first to nth pawl member holding portions; and an interval between the setting surface of the biasing member in the first pawl member holding portion and the first pawl member is smaller than each interval between the setting surfaces of the biasing member in the second to nth pawl member holding portions and the second to nth pawl members.

4. The ratchet type one-way clutch apparatus according to claim 1, wherein the first to nth pawl members each comprise, viewed from one axial side, a circular portion and a rectangular pawl portion formed integrally with the circular portion;

the first to nth pawl member holding portions each are provided, viewed from one axial side, with a circular first concave portion concaved from the inner circumferential surface of the outer race radially outwardly, and a rectangular second concave portion formed circumferentially adjacent to the first concave portion and continuously thereto and concaved from the inner circumferential surface of the outer race radially outwardly;

the circular portions of the first to nth pawl members are held rotatably in the first concave portions in the first to nth pawl member holding portions; and the pawl portions of the first to nth pawl members and the biassing members are disposed in the second concave portions in the first to nth pawl member holding portions.

5. The ratchet type one-way clutch apparatus according to claim 2, wherein the biasing members are disposed respectively between the first to nth pawl members and the first to nth pawl member holding portions; and an interval between the setting surface of the biasing member in the first pawl member holding portion and the first pawl member is smaller than each interval between the setting surfaces of the biasing member in the second to nth pawl member holding portions and the second to nth pawl members.

\* \* \* \* \*